United States Patent
Holder

(10) Patent No.: US 11,629,813 B2
(45) Date of Patent: Apr. 18, 2023

(54) SELF-STANDING TABLET CASE WITH EXPANDABLE LEGS AND COLLAPSIBLE BASE

(71) Applicant: Antonia Holder, Paget (BM)

(72) Inventor: Antonia Holder, Paget (BM)

( * ) Notice: Subject to any disclaimer, the term of this patent is extended or adjusted under 35 U.S.C. 154(b) by 1 day.

(21) Appl. No.: 17/566,756

(22) Filed: Dec. 31, 2021

(65) Prior Publication Data

US 2022/0120375 A1 Apr. 21, 2022

Related U.S. Application Data

(63) Continuation-in-part of application No. 17/240,167, filed on Apr. 26, 2021, now abandoned.

(51) Int. Cl.
*F16M 11/00* (2006.01)
*F16M 13/00* (2006.01)
*G06F 1/16* (2006.01)

(52) U.S. Cl.
CPC ......... *F16M 13/005* (2013.01); *G06F 1/1628* (2013.01)

(58) Field of Classification Search
CPC .. F16M 13/005; F16M 11/046; F16M 11/048; F16M 11/2021; G06F 1/1628; F16P 1/00
See application file for complete search history.

(56) References Cited

U.S. PATENT DOCUMENTS

| | | | | |
|---|---|---|---|---|
| 2,008,093 A * | 7/1935 | Carwardine | ............. | A47G 1/24 248/478 |
| 2,111,368 A * | 3/1938 | Kron | ....................... | F16B 9/056 403/189 |
| 2,374,409 A * | 4/1945 | Gallagher | ............ | A47B 23/043 248/456 |
| 2,535,803 A * | 12/1950 | Maack | .................... | F21V 21/32 248/299.1 |
| 2,584,015 A * | 1/1952 | Hawes | .................... | E04G 13/00 182/201 |
| D244,331 S * | 5/1977 | Woods | ........................ | D19/91 |
| 5,043,750 A * | 8/1991 | Yamaguchi | ............ | F16M 11/18 396/428 |
| 5,114,110 A * | 5/1992 | Vohora | ................. | A47B 23/043 248/160 |
| D337,762 S * | 7/1993 | Crane | ......................... | D14/451 |
| 5,290,002 A * | 3/1994 | Cohen | .................. | A47B 23/043 248/456 |
| 5,887,836 A * | 3/1999 | Back | ....................... | B63C 11/18 248/220.21 |
| 6,315,252 B1 * | 11/2001 | Schultz | .................. | F16M 11/40 108/45 |

(Continued)

*Primary Examiner* — Amy J. Sterling
(74) *Attorney, Agent, or Firm* — IPS Legal Group, P.A.; Joycelyn Brown

(57) ABSTRACT

A self-standing tablet device case covering the top, bottom, left, and right edges of a device comprising of a collapsible leg base centrally affixed on the back side of the tablet device case, whereby the collapsible base comprises of a folding base and adjustable legs that are hingedly connected to the folding base and fixedly connected at equal distances from the left and right sides of the self-standing tablet case and the non-exposed section of each adjustable leg resides within a housing that is fixedly connected to the back of the self-standing tablet case.

14 Claims, 6 Drawing Sheets

(56) References Cited

U.S. PATENT DOCUMENTS

| | | | | |
|---|---|---|---|---|
| D500,099 S * | 12/2004 | Gioffre | | D21/627 |
| D521,990 S * | 5/2006 | Richter | | D14/434 |
| 7,226,026 B2 * | 6/2007 | Lin | | F16B 47/00 |
| | | | | 248/205.8 |
| D572,681 S * | 7/2008 | Lin | | D14/126 |
| 7,729,109 B2 * | 6/2010 | Huang | | F16B 21/18 |
| | | | | 210/170.03 |
| 7,861,985 B2 * | 1/2011 | Galvin | | F16M 11/40 |
| | | | | 455/575.1 |
| 8,020,821 B2 * | 9/2011 | Chen | | F16M 13/02 |
| | | | | 248/221.11 |
| D649,949 S * | 12/2011 | Chen | | D14/126 |
| D687,428 S * | 8/2013 | Kim | | D14/253 |
| 8,727,290 B1 * | 5/2014 | De La Matta | | F16M 13/022 |
| | | | | 379/454 |
| 8,825,123 B1 * | 9/2014 | Gudino | | A45C 11/00 |
| | | | | 455/575.8 |
| 9,784,538 B2 * | 10/2017 | Sovine | | F41J 1/10 |
| 9,795,213 B1 * | 10/2017 | Vier | | G06F 1/166 |
| 10,050,658 B2 * | 8/2018 | Carnevali | | G06F 1/1632 |
| D843,435 S * | 3/2019 | Balmer | | D16/244 |
| 10,368,620 B2 * | 8/2019 | Rindlisbacher | | A45C 13/002 |
| 10,372,169 B1 * | 8/2019 | Ferren | | G06F 1/1628 |
| D868,072 S * | 11/2019 | Lei | | D14/440 |
| D872,167 S * | 1/2020 | Balmer | | D16/244 |
| 10,591,106 B2 * | 3/2020 | Pell | | F16M 13/02 |
| D881,197 S * | 4/2020 | Chen | | D14/440 |
| 10,698,452 B2 * | 6/2020 | Fenton | | G06F 1/1607 |
| 10,837,596 B2 * | 11/2020 | Forbes | | G06F 1/1601 |
| 10,927,999 B1 * | 2/2021 | Wojcik | | F16M 11/16 |
| D915,414 S * | 4/2021 | Yang | | D14/447 |
| D922,393 S * | 6/2021 | Nana | | D14/447 |
| D923,630 S * | 6/2021 | Lu | | D14/447 |
| 11,071,215 B1 * | 7/2021 | Manzano | | G06F 1/1656 |
| 11,384,895 B1 * | 7/2022 | Zhang | | A45C 11/00 |
| 2002/0140875 A1 * | 10/2002 | Ho | | F16M 11/22 |
| | | | | 348/839 |
| 2005/0085123 A1 * | 4/2005 | Moscovitch | | B60R 11/0235 |
| | | | | 439/532 |
| 2005/0205724 A1 * | 9/2005 | Carnevali | | F16M 11/40 |
| | | | | 248/122.1 |
| 2012/0024804 A1 * | 2/2012 | Moscovitch | | F16M 11/22 |
| | | | | 211/26 |
| 2012/0175474 A1 * | 7/2012 | Barnard | | F16M 11/14 |
| | | | | 248/122.1 |
| 2013/0106353 A1 * | 5/2013 | Foster | | H01M 50/256 |
| | | | | 320/114 |
| 2013/0206938 A1 * | 8/2013 | Clouser | | F16M 13/022 |
| | | | | 248/219.4 |
| 2013/0270002 A1 * | 10/2013 | Fawcett | | H01R 11/01 |
| | | | | 174/84 S |
| 2015/0034780 A1 * | 2/2015 | Petry | | F16M 11/28 |
| | | | | 29/525.01 |
| 2015/0151880 A1 * | 6/2015 | Baschnagel | | F16M 13/04 |
| | | | | 224/191 |
| 2015/0289651 A1 * | 10/2015 | Floersch | | F16M 11/10 |
| | | | | 248/300 |
| 2015/0358044 A1 * | 12/2015 | Barstead | | H04B 1/3888 |
| | | | | 455/575.1 |
| 2016/0301440 A1 * | 10/2016 | Poon | | A45C 11/00 |
| 2017/0257962 A1 * | 9/2017 | Huang | | F16M 11/041 |
| 2019/0072229 A1 * | 3/2019 | Sherman | | F16M 11/2028 |
| 2020/0162120 A1 * | 5/2020 | Poon | | G06F 1/1626 |
| 2020/0393079 A1 * | 12/2020 | Townsend | | F16M 13/00 |
| 2021/0062967 A1 * | 3/2021 | Tsai | | F16M 13/022 |
| 2021/0356989 A1 * | 11/2021 | Huang | | G06F 1/166 |
| 2021/0368975 A1 * | 12/2021 | Stockberger | | A47B 23/043 |
| 2022/0057853 A1 * | 2/2022 | Liu | | G06F 1/3246 |

* cited by examiner

SELF-STANDING TABLET CASE WITH EXPANDABLE LEGS AND COLLAPSIBLE BASE

CROSS-REFERENCE TO RELATED APPLICATION

This application is a continuation-in-part of application Ser. No. 17/240,167 filed Apr. 26, 2021.

TECHNICAL FIELD

The present invention relates to tablet cases. More particularly, the present invention concerns a self-standing tablet case with an extendable and collapsible leg base.

BACKGROUND

In today's society, the use of electronic devices is more common than not. Statistics show that smartphones and tablets are more commonly used for accessing the internet as compared to computers and laptops and it is estimated that approximately 1.28 billion people use tablets worldwide. Statistics further show that long-term tablet use leads users to look down for extended periods of time, placing strain on pressure on the neck and shoulders ("tablet neck pain"). It is well known that smartphones and tablets are prone to breaking. Accordingly, traditional device cases protect the device screen and the device frame. Traditional devices cases do not, however, afford a user the benefit of protecting the device screen and device frame while simultaneously allowing the device to stand on a flat surface, handsfree. Nor do traditional device cases afford the user the benefit of protecting the device while simultaneously relieving tablet neck pain.

Various attempts have been made to provide tablet device stands or smartphone cases that incorporate a stand attachment within the case, as can be seen with respect to U.S. Pat. Nos. 5,607,135 and 9,788,621 B2. While these disclosures provide a means to place the device on a flat surface, these disclosures do not allow for the user to adjust the height of the device.

Further attempts have been made, although unsuccessfully, to aid electronic device users with a tilting support board for viewing and utilizing a laptop or tablet device as can be seen with respect to U.S. Patent Application No. US 2007/0012827 A1. While this disclosure does provide an alternative means for a person to sit or lay in a variety of body positions while utilizing a laptop or tablet device, this disclosure does not provide a means to protect the device screen or frame, nor does disclosure allow for an ease of maneuvering or adjusting the device height.

As can be seen, various attempts have been made which may be found in the related art but have been unsuccessful. Therefore, a need exists for a new self-standing tablet case with an extendable and collapsible leg base to avoid the challenges and problems with the prior art.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

Furthermore, all elements listed by name, such as tablet, case, device, legs, etc., are herein meant to include or encompass all equivalents for such elements. Such equivalents are contemplated for each element named in its particular herein. Also, while the invention will be described in connection with tablet devices, it is understood that the invention is not limited in scope to use with tablet devices.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention provides a novel solution for a tablet case that can be made to stand erect on a flat surface while simultaneously protecting the integrity of the device.

The features of the invention which are believed to be novel are particularly pointed out and distinctly claimed in the concluding portion of the specification. These and other features, aspects, and advantages of the present invention will become better understood with reference to the following drawings and detailed description.

In some embodiments, the present invention may provide for a self-standing tablet device case covering the top, bottom, left, and right edges of a device along with the back portion of the device and is configured and constructed in a way removably adhere to the back portion of the device by allowing the top, bottom, left, and right edges of the tablet device case to secure to the corresponding frame edges of the device. The self-standing tablet case further comprises of a retractable standing leg base centrally affixed on the back side of the self-standing tablet case, whereby the retractable standing leg base comprises of a folding base and adjustable legs that are hingedly connected to the folding base and fixedly connected at equal distances from the left and right sides of the self-standing tablet case, whereby the non-exposed section of each adjustable leg resides within a housing that is fixedly connected to the back of the self-standing tablet case.

The configuration of the present inventions allows for the expandable legs to extend from the leg housings to adjust the distance the self-standing tablet case is from the folding base when the folding base resides on a flat surface, allowing the user to modify the height of the tablet from the surface to suit his or her viewing preferences.

The embodiments of the invention described herein are exemplary and numerous modifications, variations and rearrangements can be readily envisioned to achieve substantially equivalent results, all of which are intended to be embraced within the spirit and scope of the invention. Furthermore, while the preferred embodiment of the invention has been described in terms of the components and configurations, it is understood that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective a self-standing tablet case with an extendable and collapsible leg base.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
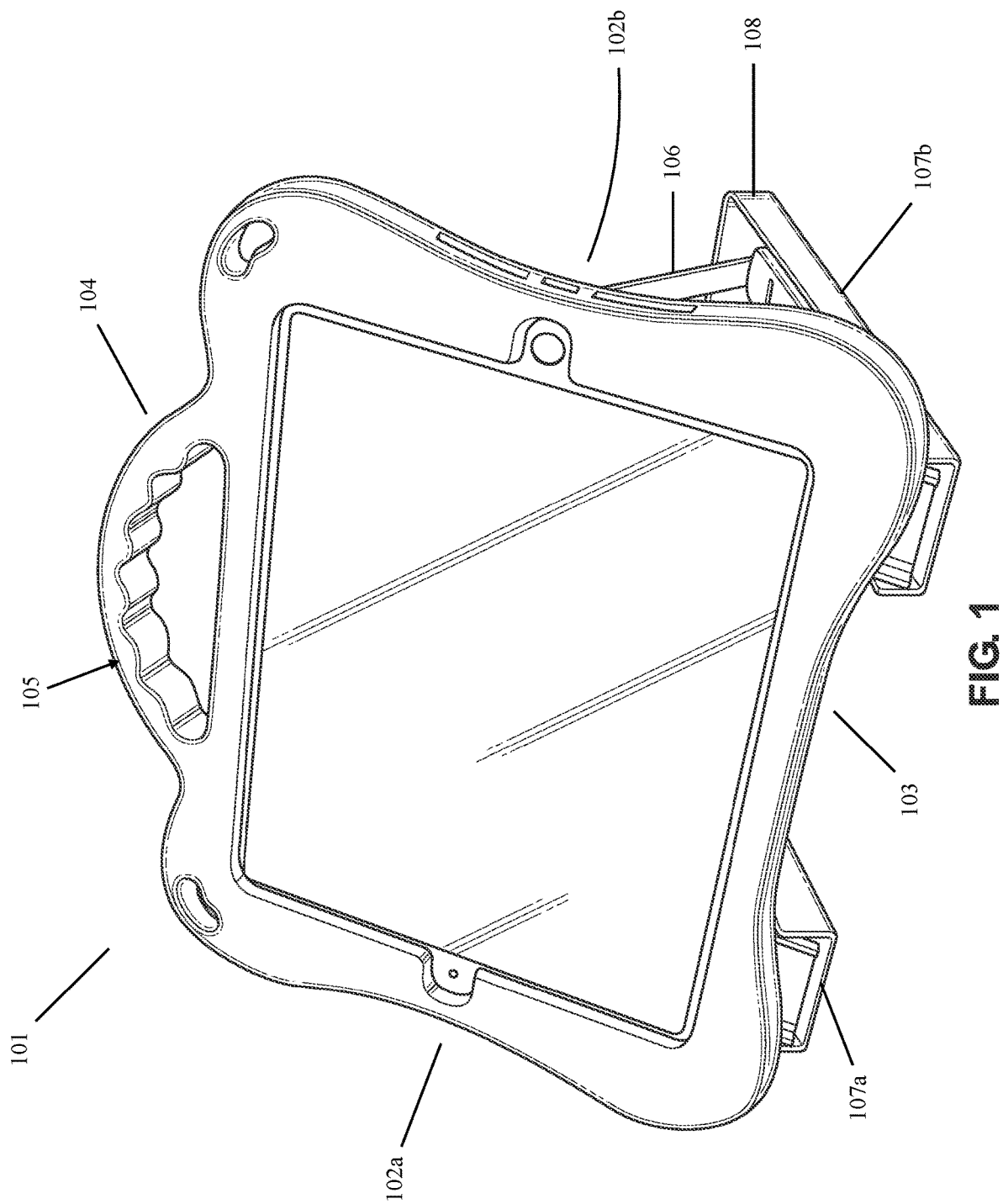
FIG. 1 shows a front perspective view of a self-standing tablet case with an extendable and collapsible leg base in accordance with an embodiment of the invention.

Turning attention to FIG. 1, a perspective view of a self-standing tablet case with an extendable and collapsible leg base in accordance with an embodiment of the invention is shown. In the embodiment depicted, a viewer may perceive a self-standing tablet case with an extendable and collapsible leg base 101 comprising a left side edge 102a, a right-side edge 102b, a bottom side edge 103, and a top side edge 104 that is fixedly connected to a carrying handle 105. In the embodiment shown, a viewer may perceive a folding standing leg 106 that is slidably connected to a right leg base 107a, and a left leg base 107b (connection not shown for left leg base). A viewer may also perceive that the right leg base 107a and the left leg base 107b are part of the collapsible base frame 108, which allows the self-standing tablet case with an extendable and collapsible leg base to remain in an upright and angled position on a flat surface.

Figure 2A:
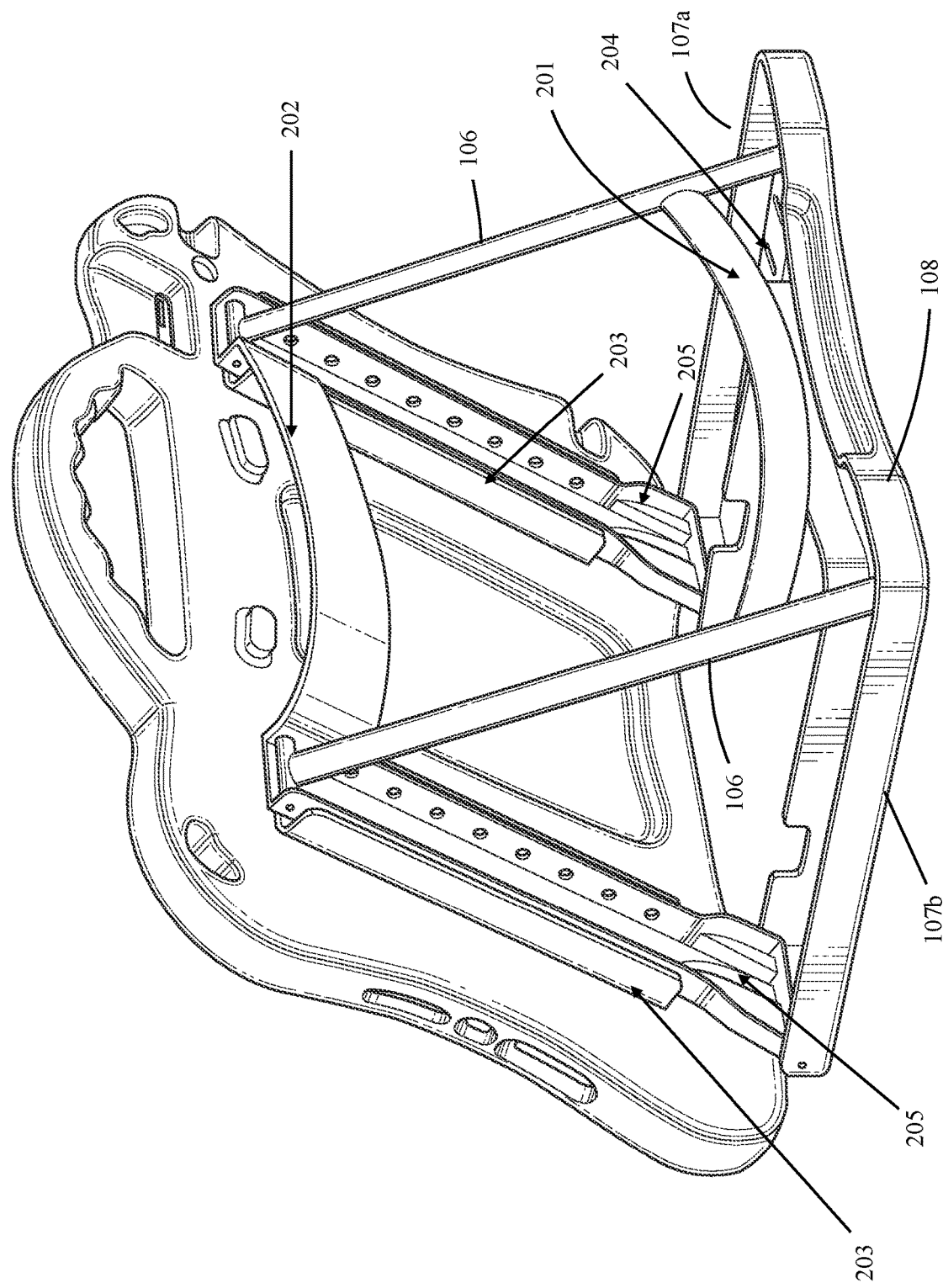
FIG. 2A shows a rear perspective view of a self-standing tablet case with an extendable and collapsible leg base in accordance with an embodiment of the invention.
Figure 2B:
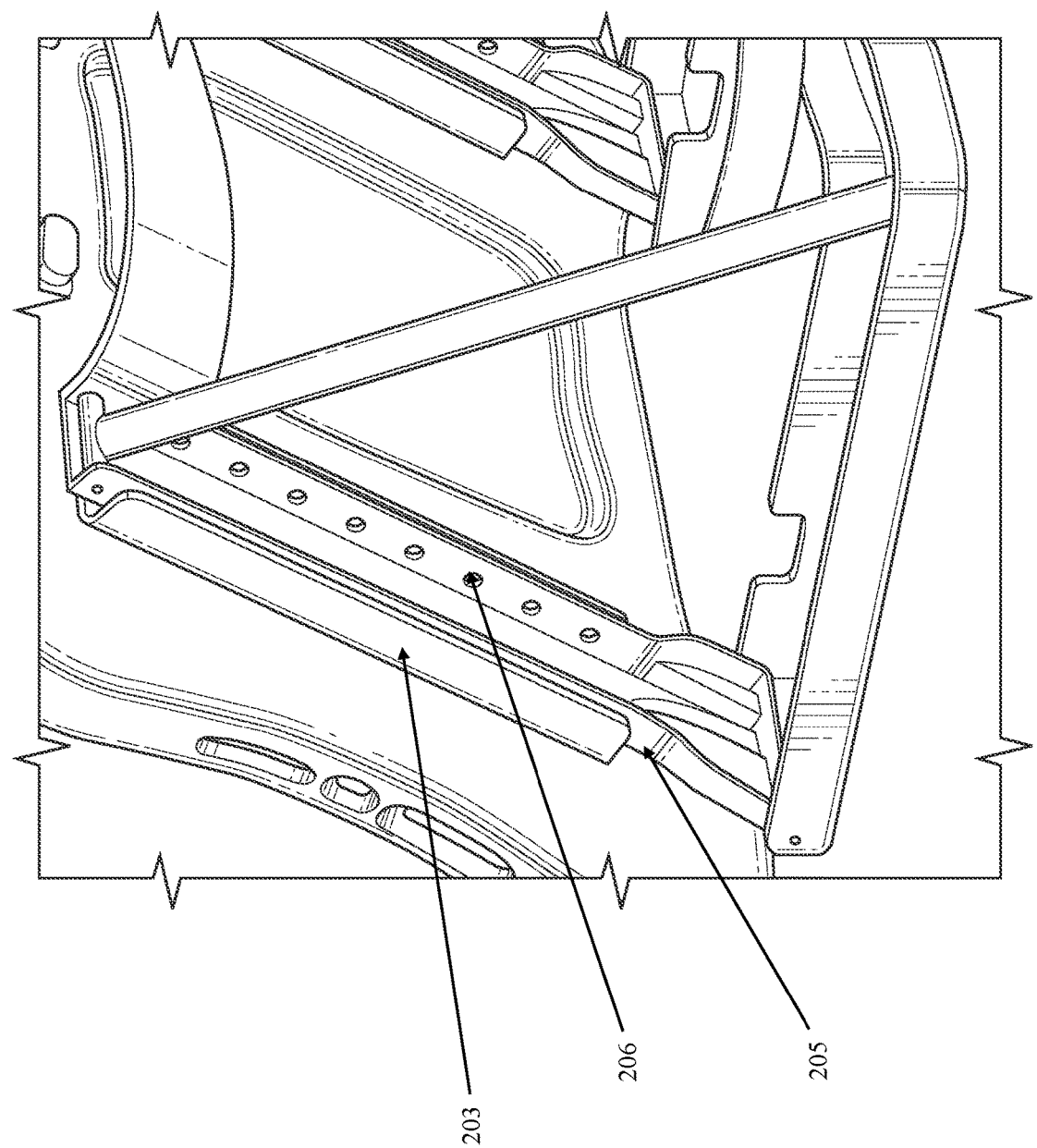
FIG. 2B shows a rear exploded view of a self-standing tablet case with an extendable and collapsible leg base in accordance with an embodiment of the invention.

With respect to FIG. 2A, a rear perspective view of a self-standing tablet case with an extendable and collapsible leg base in accordance with an embodiment of the invention may be perceived. In the embodiment depicted, a viewer may perceive that the base of the folding standing legs 106 are supported by a base leg frame bar 201 and is configured to be folded and collapsed into the leg stand housing 203.

The base of the folding standing legs 106 are stabilized by a plurality of tracks 204 that are positioned within the left and right leg base 107a, 107b. A viewer may perceive that the top of the folding standing legs 106 are stabilized by a top leg frame bar 202. A viewer may also perceive that the top frame bar 202 is fixedly connected to the retractable legs 205, which are spaced equal distances from the left and right side edges 102a, 102b. The leg stand housing is configured to hold the retractable legs 205 which are configured to extend from or retract into the leg stand housing 203.

With respect to FIG. 2A, an exploded rear view of the self-standing tablet case with an extendable and collapsible leg base in accordance with an embodiment of the invention is shown. In the embodiment shown, a viewer may perceive that the retractable legs 205 comprises a plurality of side tracks 206 which are configured to stabilize the retractable leg within the leg housing such that the retractable leg can remain in an extended or retracted position without the aid of the user.

Figure 3:
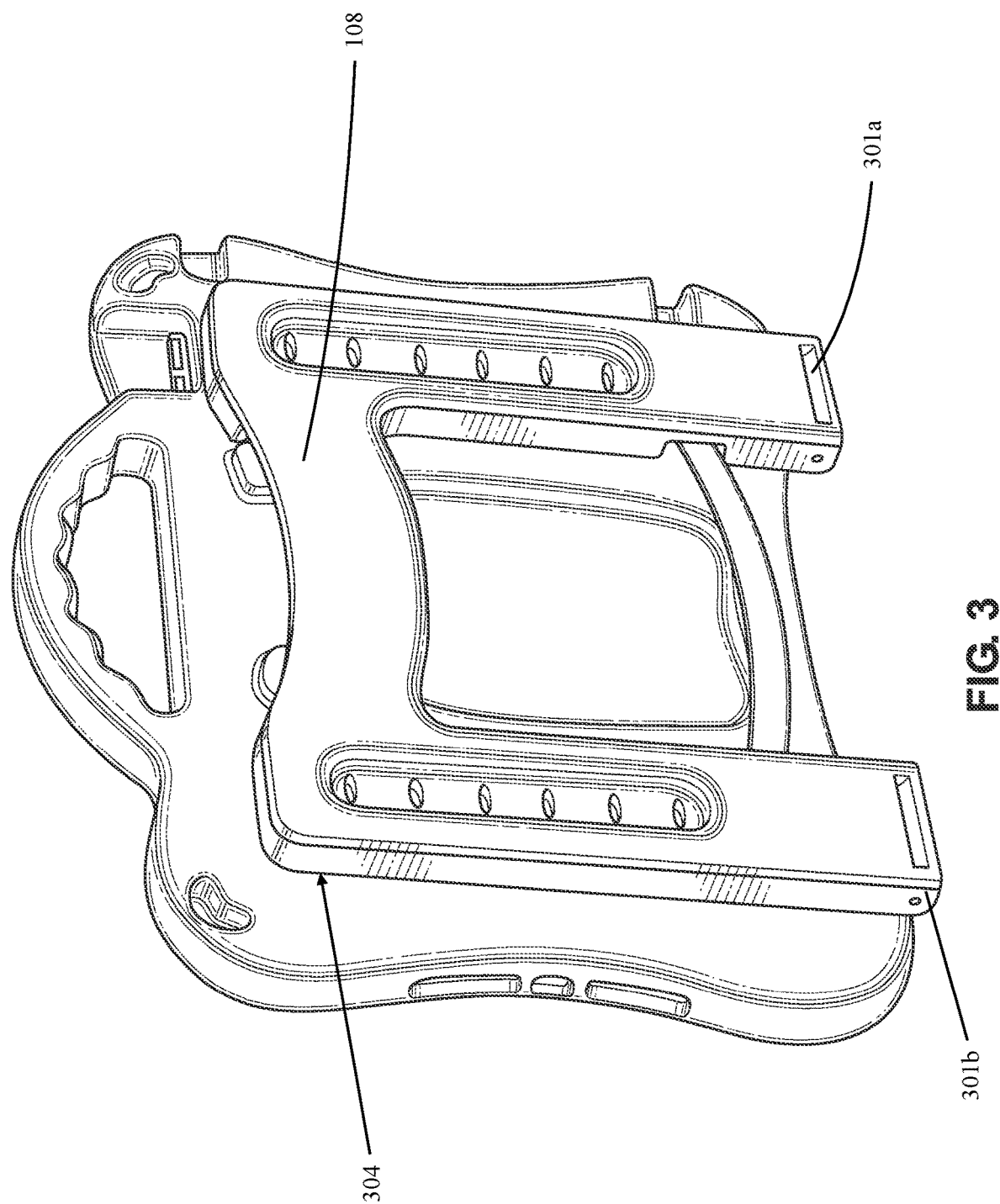
FIG. 3 shows a rear perspective view of a self-standing tablet case with an extendable and collapsible leg base in a closed position in accordance with a preferred embodiment of the invention.

As may be seen in FIG. 3B, the collapsible base frame 108 further comprises of hinge members 301a, 301b that are hingedly attached to the left and right leg base 107a, 107b thereby allowing the collapsible base frame to fold into the rear of the tablet case frame. A viewer may perceive that the left and right leg base 107a, 107b are configured to fold over 304 the leg stand housing 203 when the self-standing tablet case with an extendable and collapsible leg base is in a closed position.

Figure 4A:
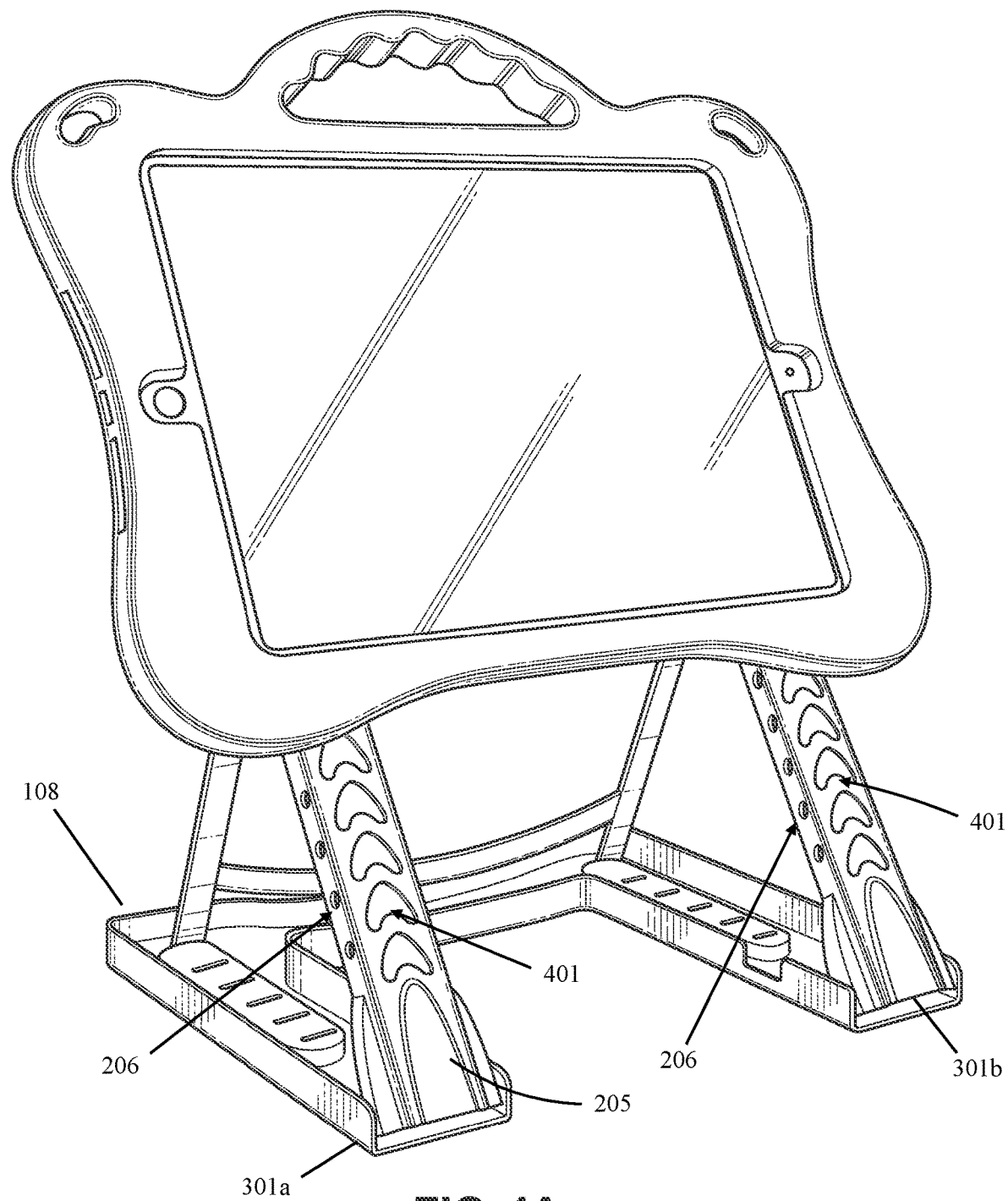
FIG. 4A shows a front perspective view of a self-standing tablet case with an extendable and collapsible leg base in a raised position in accordance with a preferred embodiment of the invention.
Figure 4B:
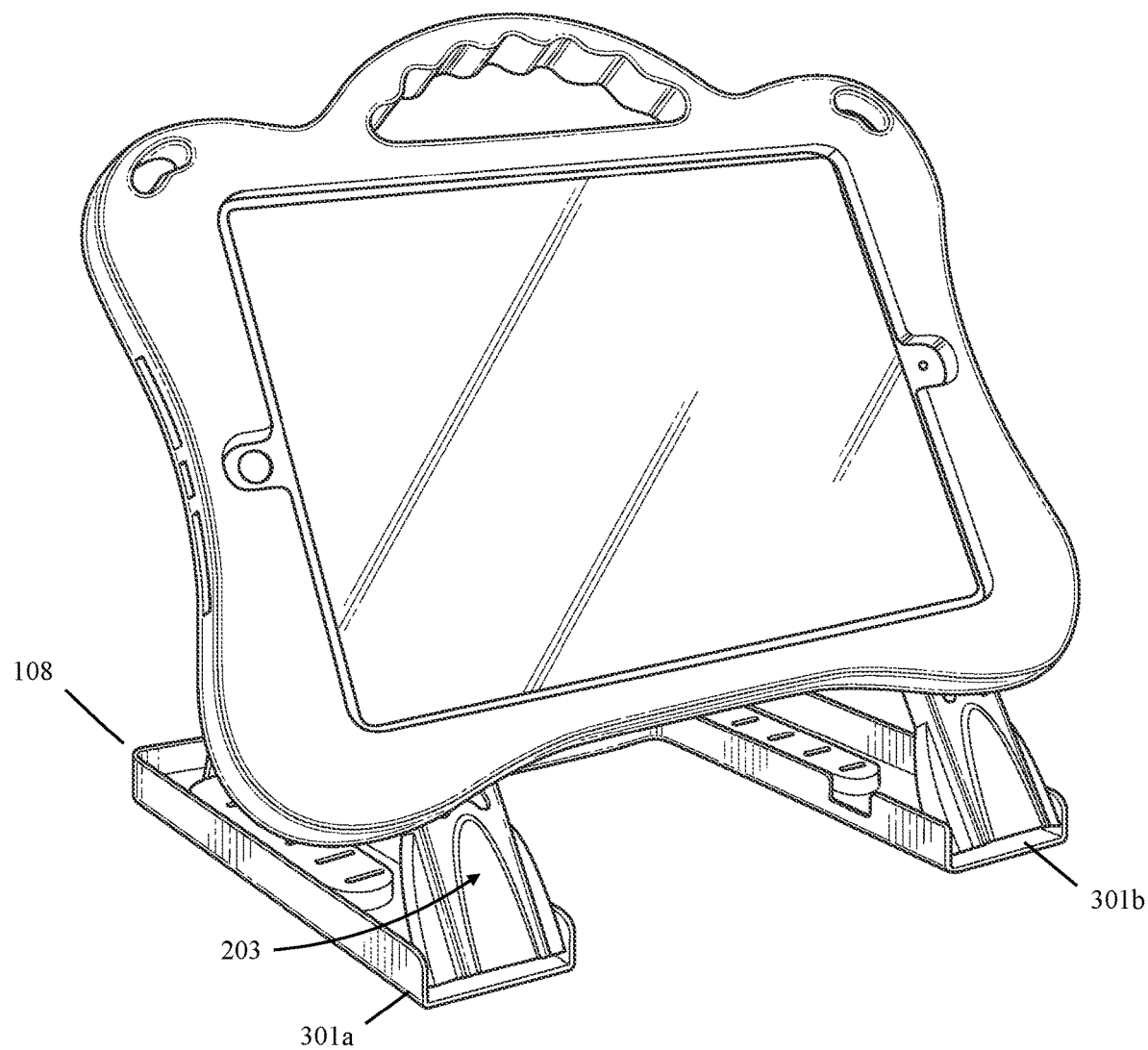
FIG. 4B shows a front perspective view of a self-standing tablet case with an extendable and collapsible leg base in a lowered position in accordance with a preferred embodiment of the invention.

Turning to FIGS. 4A and 4B, a self-standing tablet case with an extendable and collapsible leg base in an extended and retracted position, respectively, is shown in accordance with an embodiment of the present invention. As shown in FIG. 4A, a viewer may perceive a plurality of front tracks 401 configured to stabilize the retractable leg within the leg housing such that the retractable leg can remain in an extended or retracted position without the aid of the user. A viewer may also perceive that the retractable legs 205 further comprise a plurality of front tracks 206 which are configured to stabilize the retractable leg within the leg housing such that the retractable leg can remain in an extended or retracted position without the aid of the user, as shown in FIG. 4B.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. A self-standing tablet case with an extendable and collapsible leg base comprising:
    a tablet housing configured to encase a tablet, comprising a posterior back wall, four side walls, and an opening arranged to removably attach to the outer frame of a tablet;
    a collapsible base frame comprising a right leg base member having a plurality of tracks, a left leg base member having a plurality of tracks, and a top support base member;
    at least one left retractable leg member and at least one right retractable leg member, wherein each retractable leg member has a proximal end, a distal end, and a main body having a plurality of side tracks and a plurality of front tracks;
    at least one left folding standing leg member and at least one right folding standing leg member, wherein each folding standing leg member has a proximal end, a distal end, and a main body;
    at least one top leg support bar comprising a left side and a right side whereby the left side of the top leg support bar is hingedly connected to the proximal end of the at least one left folding standing leg member and fixedly connected to the proximal of the at least one left retractable leg member, and the right side of the top leg support bar is hingedly connected to the proximal end of the at least one right folding standing leg member and fixedly connected to the proximal end of the at least one right retractable leg member;
    at least one bottom leg support bar having a right side and a left side whereby the left side is fixedly connected to the distal end of the at least one left folding standing leg, and the right side is fixedly connected to the distal end of the at least one standing leg; and
    at least one left side retractable leg housing fixedly connected to the posterior back wall of the tablet housing and at least one right side retractable leg housing fixedly connected to the posterior back wall of the tablet housing, whereby each retractable leg housing is configured to hold a retractable leg.

2. The self-standing tablet case with an extendable and collapsible leg base of claim 1 wherein the left leg base member of the collapsible base frame is configured to encase the left side retractable leg housing.

3. The self-standing tablet case with an extendable and collapsible leg base of claim 1 wherein the right leg base member of the collapsible base frame is configured to encase the right side retractable leg housing.

4. The self-standing tablet case with an extendable and collapsible leg base of claim 1 wherein the top support base member of the collapsible base frame is configured to encase the top leg support bar.

5. The self-standing tablet case with an extendable and collapsible leg base of claim 1 wherein the collapsible base frame is configured to hingedly close upon the left side retractable leg housing, the right side retractable leg housing, and the top leg support bar.

6. The self-standing tablet case with an extendable and collapsible leg base of claim 1 wherein the plurality of side tracks on the main body of the left retractable leg and the plurality of side tracks on main body of the right retractable left are each configured to stabilize the right and left side of each main body within each left and right retractable leg housing.

7. The self-standing tablet case with an extendable and collapsible leg base of claim 1 wherein the plurality of front tracks on the main body of the left retractable leg and the plurality of front tracks on main body of the right retractable left are each configured to stabilize the right and left side of each main body within each left and right retractable leg housing.

8. The self-standing tablet case with an extendable and collapsible leg base of claim 1 where the proximal end of the left retractable leg may be retracted within the left retractable leg housing and stabilized on a flat surface structure.

9. The self-standing tablet case with an extendable and collapsible leg base of claim 1 where the proximal end of the right retractable leg may be retracted within the right retractable leg housing and stabilized on a flat surface structure.

10. The self-standing tablet case with an extendable and collapsible leg base of claim 1 where the proximal end of the left retractable leg may be extended from the left retractable leg housing and stabilized on a flat surface structure.

11. The self-standing tablet case with an extendable and collapsible leg base of claim 1 where the proximal end of the right retractable leg may be extended from the right retractable leg housing and stabilized on a flat surface structure.

12. The self-standing tablet case with an extendable and collapsible leg base of claim 1 where the proximal end of each leg member fixedly connected to each leg housing may be extended from each leg housing.

13. The self-standing tablet case with an extendable and collapsible leg base of claim 1 wherein the height of the left folding standing leg may be adjusted along the plurality of tracks of the left leg base member.

14. The self-standing tablet case with an extendable and collapsible leg base of claim 1 wherein the height of the right folding standing leg may be adjusted along the plurality of tracks of the right leg base member.

* * * * *